Aug. 16, 1932.                H. BARR                1,872,556
FISH LOCK
Filed Aug. 13, 1930
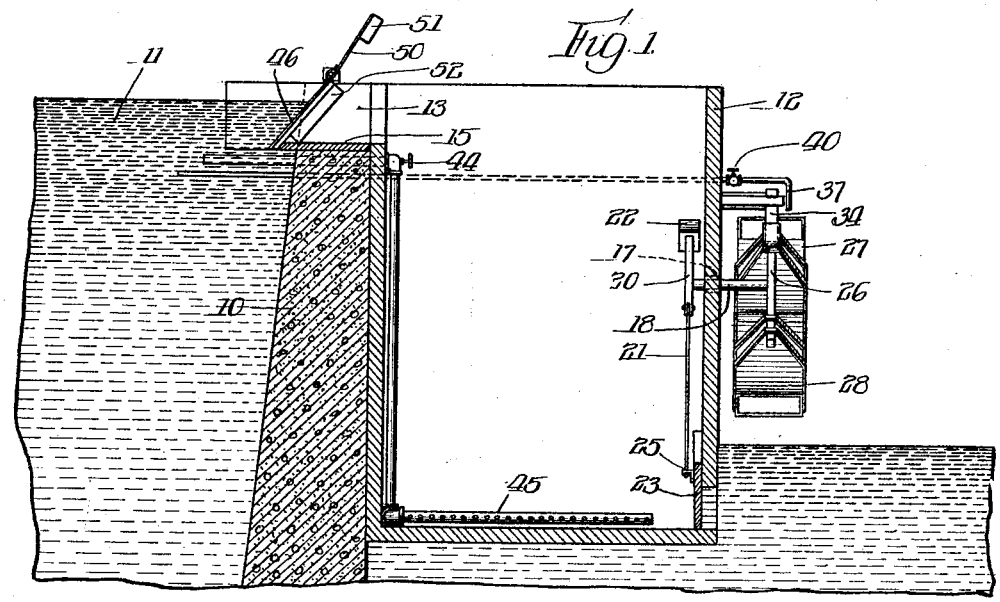
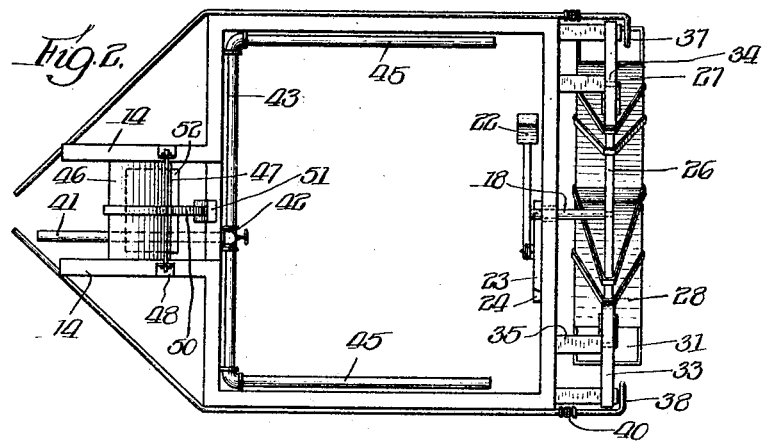
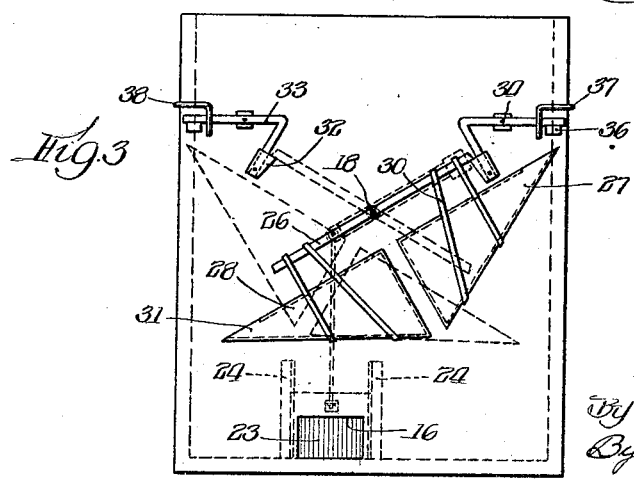
Inventor:
Harry Barr
By Wilkinson, Huxley,
Byron & Knight
attys.

Patented Aug. 16, 1932

1,872,556

UNITED STATES PATENT OFFICE

HARRY BARR, OF IRONWOOD, MICHIGAN

FISH LOCK

Application filed August 13, 1930. Serial No. 475,003.

The invention relates to improvements in fish locks and has for an object to provide improved means for allowing fish to work their way up streams past artificial or natural obstructions such as dams or falls and to also enable the fish to go down stream without going directly over the dam or falls.

A yet further object is to provide an improved fish lock which will operate automatically by using the natural flow of the water of the stream. In this connection another important feature of the present construction is the provision of adjustable means for regulating the flow of water for operating the device so that when once adjusted and set in operation, the device will continue to operate without constant attendance and inspection by an operator.

Still another object is to provide a fish lock of simple and rigid construction employing relatively few parts, one which will be positive and efficient in operation, and which will be capable of meeting the exacting requirements of service conditions.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a sectional view showing the construction of the present invention;

Figure 2 is a top plan view of the device as shown in Figure 1;

Figure 3 is a front elevation of the device showing the operating mechanism for the same.

The device is adapted to be located in streams or rivers, and as shown in the drawing, is associated with any conventional form of dam 10 or similar obstruction for impounding a body of water such as 11. Located on the downstream side of the dam is a tank 12 constructed of either wood, steel or concrete, and is provided with a waterway or passageway 13 for connecting the tank with the waters above the dam. The waterway is defined by side walls 14 and a bottom wall 15. On the side of the tank opposite the waterway 13 is an opening 16, located in the lower portion of the tank and serving to connect the tank with the waters below the dam. Preferably the tank is located in relation to the dam so that the base of the tank is at least three feet below the low water mark of the stream below the dam, and several feet above high water mark at the top of the dam. It is also to be understood that the device, although shown associated with a dam, could with equal efficiency be applied so as to allow fish to work their way up stream past natural obstructions such as a falls.

Located centrally of the downstream wall of the tank 12 is an opening 17 into which is journaled a shaft 18. Secured to the inner end of shaft 18 is a bar 20 pivotally connected at one end to rod 21 and at its other end to a counterweight 22. The opening 16 is adapted to be closed by gate 23 mounted so as to have vertical sliding movement within slides 24. The gate is operatively connected to shaft 18 by means of the rod 21, which is pivoted to the gate at 25. Upon the outer end of shaft 18 is secured a transverse bar 26 to which is suspended at its outer ends thereof containers 27 and 28 respectively. Tie rods 30 securely and rigidly suspend the containers from the transverse rod. The buckets or containers are preferably constructed of a triangular formation, as shown and are provided with openings 31 in their outer end by means of which the containers are filled and emptied.

The containers are adapted to be retained in their raised or lowered position by means of catches 32 secured to the depending ends of angle bars 33. The angle bars are in turn pivoted at 34 to outwardly extending members 35. The angle bars are counterbalanced by weights 36 secured to their outer ends so that bucket 27 will be held in its raised position as shown in Figure 3, until sufficient water is discharged into the same to overbalance the weight 36, which will function to cause the catch 32 to release its engagement with the transverse bar whereupon the bucket 27 will assume its lower position, thereby raising the bucket 28.

Discharge pipes 37 and 38 are provided, the pipes having depending ends located directly over the openings 31 in the containers when the same are held in a raised position. The discharge pipes in turn extend from the waters above the dam so that a small quantity of water is discharged continuously by the pipes. For regulating this flow of water the discharge pipes 37 and 38 are provided with regulating valves 40. Also having connection with the waters above the dam is a conduit 41 which extends into the tank 12 to the bottom thereof where it is connected by means of a pipe union 42 to connecting pipes 43, extending around the three sides of the tank at the base thereof. The conduit 41 is provided with the regulating valve 44, so that the flow of water through the same can be regulated as desired. Pipes 43 are also provided with a number of small openings 45 which are disposed on the sides thereof so that the water discharged will not interfere with the fish trapped in the tank 12.

The waterway 13 has an automatic gate 46 located therein, the gate serving to engage the lower wall 15 forming a closure for the waterway to prevent the waters above the dam from flowing into the tank 12. The gate 46 is pivotally mounted within the waterway by means of a bar 47 journaled upon the sides 14 by members 48. An upwardly extending arm 50 secured to the gate 46 is provided with a counterweight 51, so that the gate when opened is held in a steady position. It will be seen that the gate 46 is automatically closed by the pressure of the waters above the dam and thus remains closed until water rises in the tank 12 to a level sufficient to counteract the pressure. By means of a float 52 secured to the underside of gate 46 the same is caused to open and is thus held in open position against the flow of the water through water tank 13, by reason of the counter-balancing device described.

In operation of the device a continuous flow of water is supplied to the tank through openings 45 in the pipe 43, since the outwardly extending end of the conduit opens into the waters above the dam 10. The water in the tank is however periodically discharged through opening 16, since the gate 23 is raised and lowered by means of the containers 27 and 28. The device is actuated by the natural flow of the waters of the stream, since the discharge pipes 37 and 38 are so disposed as to conduct the waters from above the dam and to discharge the same at a point over the various containers respectively. As disclosed in Figure 3, it will be seen that bucket 27 is held in raised position by catch 32, as water is discharged into the same through opening 31 by pipe 37. The flow from pipe 37 can be regulated by valve 40 so that after a desired length of time the water in 27 will be sufficient to cause the bucket to assume its lower position, thus raising bucket 28. The oscillating movement imparted to shaft 18 causes actuation of the bar 20 to which is operatively connected the gate 23. It is thus seen that the containers cause intermittent raising and lowering of the gate 23.

Assuming that the gate 23 is in open position, the water in tank 12 will be at a level equal to the level of the water down stream. Fish working their way up stream will therefore have access to the tank 12 through the opening 16. In time the gate 23 will be lowered to close the opening and the water discharged through openings 45 will cause the tank 12 to fill with water until the same is substantially at the level of the waters above the dam. As soon as this condition is reached the water pressure on both sides of the gate 46 will be equalized and by reason of float 52, the gate will be caused to swing upwardly to open the waterway 13. The fish trapped in tank 12 will therefore have access through the waterway 13 to the waters above the dam. As the device continues in operation the gate will again be raised to discharge the water in tank 12 allowing more fish to work their way into the tank whereupon the same operation is again repeated. The device functions to also allow the fish to work their way down stream, that is, from the waters above the dam to the waters below the dam, as will be clear from the above description.

The fish lock constructed according to the present invention is extremely simple and is entirely automatic in operation, being filled by means of an inlet tube from the waters above the dam and being emptied by the structure including the containers and their associated gate. The water enters the lock at considerable pressure and thus creates a constant whirling which is an attraction to the fish, enabling them to find the upper passageway and also attracting them toward the bottom opening. The valves admitting water to the containers can be set at different timed intervals so that the apparatus is adaptable to varying conditions as well as being suited to rivers and streams having dams of considerable height.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a device of the character described, in combination, a tank, an opening in the lower portion of said tank, a gate for closing said opening, and means for raising and lowering said gate comprising a shaft having connection to said gate, a transverse bar connected to said shaft, and containers located on the outer ends of said bar.

2. In a device of the class described, in combination, a tank having means continuously supplying the same with water, an opening in the lower portion of said tank, a gate for closing said opening, means for raising and lowering said gate to alternately fill and empty said tank including a shaft having connection to said gate, a transverse bar connected to said shaft, containers secured to the ends of said shaft, and water supply pipes terminating above said containers.

3. In a device of the class described, in combination, a tank having means continuously supplying the same with water, an opening in the lower portion of said tank, a gate for closing said opening, means for raising and lowering said gate to alternately fill and empty said tank including a shaft having connection to said gate, a transverse bar connected to said shaft, containers secured to the ends of said shaft, water supply pipes terminating above said containers, and a passageway in the upper part of the tank communicating with the waters above the dam or similar obstruction.

4. Means for enabling fish to surmount dams and similar obstructions comprising a vertical enclosure located adjacent a dam, a passageway for connecting the enclosure with the waters above the dam, a pivoted gate counter-balanced in a direction to close the passageway, said gate having a float to cause opening when the enclosure is filled with water, an opening provided in the lower portion of said enclosure and leading to the water below the dam, a vertically operating gate actuated by the flow of water from above the dam for alternately opening and closing said opening, and a conduit for continuously supplying water to the enclosure.

5. Means for enabling fish to surmount dams and similar obstructions comprising a vertical enclosure located adjacent a dam, a passageway for connecting the enclosure with the waters above the dam, a pivoted gate normally closing the passageway but opening when water from the enclosure overflows into the passageway, an opening provided in the lower portion of said enclosure and leading to the water below the dam, a gate for closing said opening, said gate being alternately raised and lowered by the flow of water from above the dam, and a supply pipe terminating in the base of the enclosure for continuously supplying water to the enclosure, whereby the enclosure is alternately filled with water and emptied.

6. In a device for enabling fish to surmount dams and similar obstructions comprising a vertical enclosure located adjacent the dam, a conduit terminating in the bottom of the enclosure for continuously supplying water thereto, a passageway for connecting the enclosure with the waters above the dam, means normally closing the passageway but opening when water from the enclosure overflows into the passage, and means for alternately filling the enclosure with water and allowing the water to escape including a vertically operating gate in the lower portion of the enclosure leading to the waters below the dam, a rotatable shaft connected with the gate, and container supported by the shaft outside the enclosure, said containers being alternately filled with water to oscillate the shaft.

7. In a device for enabling fish to surmount dams and similar obstructions comprising a vertical enclosure located adjacent the dam, said enclosure being continuously supplied with water, an opening in the lower portion of the enclosure leading to the waters below the dam and allowing fish to enter the enclosure, a gate for closing said opening, and means for periodically raising the gate and then lowering the same including a shaft having connection with the gate, containers supported by said shaft to the outside of the enclosure, pipes terminating above the containers and leading from the waters above the dam whereby the containers are alternately filled and emptied causing oscillation of the shaft.

Signed at Ironwood, Michigan, this 4th day of August, 1930.

HARRY BARR.